(12) United States Patent
Cai (10) Patent No.: US 10,680,304 B2
(45) Date of Patent: Jun. 9, 2020

(54) COMBINER

(71) Applicant: Huawei Technologies Co., Ltd., Shenzhen (CN)

(72) Inventor: Dantao Cai, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/020,404

(22) Filed: Jun. 27, 2018

(65) Prior Publication Data

US 2018/0309181 A1 Oct. 25, 2018

Related U.S. Application Data

(63) Continuation of application No. PCT/CN2016/111371, filed on Dec. 21, 2016.

(30) Foreign Application Priority Data

Dec. 28, 2015 (CN) .......................... 2015 1 1003618

(51) Int. Cl.
   *H01P 1/213* (2006.01)
   *H04B 1/10* (2006.01)
   (Continued)

(52) U.S. Cl.
   CPC ......... *H01P 1/2135* (2013.01); *H04B 1/1081* (2013.01); *H04B 1/126* (2013.01); *H04B 1/0057* (2013.01)

(58) Field of Classification Search
   CPC ..... H01P 1/2135; H04B 1/1081; H04B 1/126; H04B 1/0057

(Continued)

(56) References Cited

U.S. PATENT DOCUMENTS

| 4,186,359 A | 1/1980 | Kaegebein |
| 2004/0183624 A1 | 9/2004 | Liang et al. |

(Continued)

FOREIGN PATENT DOCUMENTS

| CN | 201210508 Y | 3/2009 |
| CN | 102354783 A | 2/2012 |

(Continued)

OTHER PUBLICATIONS

Chen et al.,"Highly Linear and Highly Efficient Dual-Carrier Power Amplifier Based on Low-Loss RF Carrier Combiner", IEEE Transactions on Microwave Theory and Techniques, vol. 62, No. 3, Institute of Electrical and Electronics Engineers, New York, New York (Mar. 2014).

Primary Examiner — Robert J Pascal
Assistant Examiner — Kimberly E Glenn
(74) Attorney, Agent, or Firm — Leydig, Voit & Mayer, Ltd.

(57) ABSTRACT

Embodiments of this disclosure provide a combiner, which includes an external conductor and an internal conductor, the external conductor and the internal conductor form at least two band-stop filters, and the at least two band-stop filters form at least two passbands; the at least two passbands include a first target combined passband and a second target combined passband, and a frequency of the first target combined passband is lower than a frequency of the second target combined passband; and a signal channel is included between a signal input end and a signal output end of a band-stop filter to which the second target combined passband belongs, the signal channel is formed by the internal conductor, and the internal conductor forming the signal channel includes a capacitor. Implementing the present invention can shorten a length of a main transmission line of the signal channel, and reduce a volume of the combiner.

16 Claims, 5 Drawing Sheets

(51) Int. Cl.
*H04B 1/12* (2006.01)
*H04B 1/00* (2006.01)

(58) Field of Classification Search
USPC .......................................................... 333/134
See application file for complete search history.

(56) References Cited

U.S. PATENT DOCUMENTS

2008/0174386 A1* 7/2008 Ono ...................... H01P 1/2135
333/132
2013/0285765 A1 10/2013 Subedi et al.

FOREIGN PATENT DOCUMENTS

| CN | 202178359 U | 3/2012 |
| CN | 202196847 U | 4/2012 |
| CN | 203242725 U | 10/2013 |
| CN | 203326071 U | 12/2013 |
| CN | 105489990 A | 4/2016 |
| WO | 2008031042 A1 | 3/2008 |

* cited by examiner

COMBINER

CROSS-REFERENCE TO RELATED APPLICATIONS

This application is a continuation of International Application No. PCT/CN2016/111371, filed on Dec. 21, 2016, which claims priority to Chinese Patent Application No. 201511003618.4, filed on Dec. 28, 2015. The disclosures of the aforementioned applications are hereby incorporated by reference in their entireties.

TECHNICAL FIELD

The present invention relates to the field of electronic technologies, and in particular, to a combiner.

BACKGROUND

With development of communications technologies, antennas of different frequency bands need to be integrated into one antenna. When sharing a same dipole, antennas of different frequency bands each need to have an independent downtilt adjustment function. Therefore, after the antennas are each provided with a phase shifter for downtilt adjustment, a combiner needs to be used to synthesize signals of the antennas onto the same dipole. Usually, because two frequency bands may be relatively close, each filter that forms the combiner needs to have a steep roll-off feature.

Figure 1:
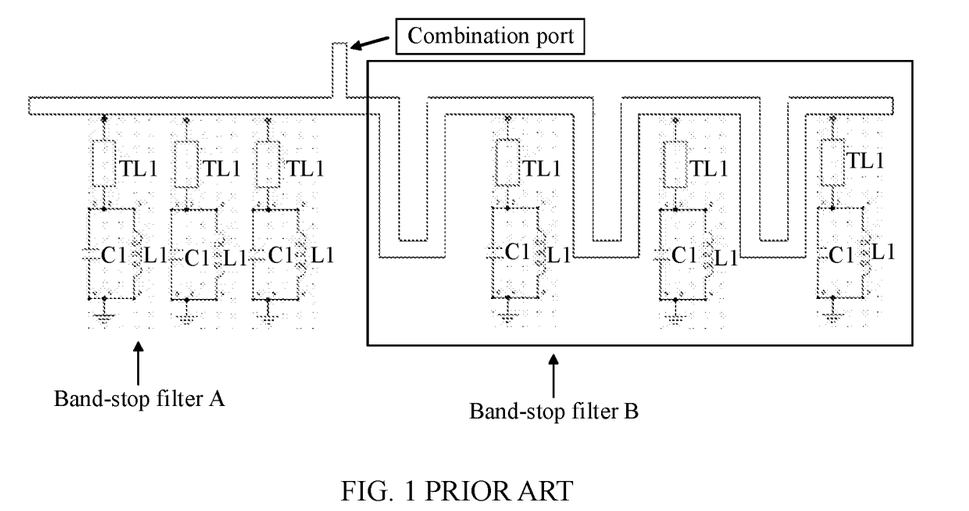
FIG. 1 shows an equivalent structure of a combiner in the prior art according to an embodiment of the present invention.

Usually, a filter with a steep roll-off feature is a band-stop filter, and an advantage of the band-stop filter is that a frequency of a passband is very close to a frequency of a stopband, so that a requirement for suppressing at least 30 dB at tens of MHz or ten-odd MHz outside the passband can be satisfied. Therefore, a combiner is usually formed by a plurality of band-stop filters. As shown in FIG. 1, on the left of a combination port, a passband frequency of a band-stop filter is lower than a stopband frequency, and on the right of the combination port, a passband frequency of a band-stop filter is higher than a stopband frequency. However, such a combiner has a disadvantage that in the band-stop filter whose passband frequency is higher than the stopband frequency, a transmission line of a signal channel between two resonant cavities needs to be designed to be ¼ longer than a resonant frequency wavelength. This increases a volume of the combiner.

SUMMARY

Embodiments of the present invention provide a combiner, to shorten a length of a main transmission line of a signal channel and reduce a volume of the combiner while keeping a required steep roll-off feature of a band-stop filter.

A first aspect of the present invention provides a combiner. The combiner includes an external conductor and an internal conductor, the external conductor and the internal conductor form at least two band-stop filters, and the at least two band-stop filters form at least two passbands.

The at least two passbands include a first target combined passband and a second target combined passband, and a frequency of the first target combined passband is lower than a frequency of the second target combined passband.

A signal channel is included between a signal input end and a signal output end of a band-stop filter to which the second target combined passband belongs, the signal channel is formed by the internal conductor, and the internal conductor forming the signal channel includes a capacitor.

In this way, disposing the capacitor in the signal channel may shorten a length of a main transmission line of the signal channel and reduce a volume of the combiner while keeping a required steep roll-off feature of the filter.

Based on the first aspect, in a first feasible implementation of the first aspect, the second target combined passband includes at least one passband, and a frequency difference between adjacent passbands in the at least one passband is less than a preset threshold.

A frequency difference between the first target combined passband and the second target combined passband is less than the preset threshold. In this way, a frequency relationship between the combined passbands is further limited, thereby precisely determining the band-stop filter to which the capacitor needs to be added, and effectively shortening the length of the main transmission line of the signal channel of the band-stop filter.

Based on the first aspect, in a second feasible implementation of the first aspect, the external conductor of the combiner includes two opposite parallel surfaces, and a metal is disposed on or a conducting layer is attached to the two opposite parallel surfaces. Forming the external conductor by disposing the metal on or attaching the conducting layer to the opposite parallel surfaces can reduce a weight of the combiner.

Based on the second feasible implementation of the first aspect, in a third feasible implementation of the first aspect, the internal conductor forming the signal channel includes at least two strip conductors, and a splicing and overlapping part of the at least two strip conductors forms the capacitor; or the internal conductor forming the signal channel includes a first conductor and a second conductor, the first conductor is formed by microstrips laid on upper and lower surfaces of a first part of a printed circuit board (PCB), and the microstrips on the upper and lower surfaces are connected by using a metalized via, the second conductor is formed by microstrips laid on upper and lower surfaces of a second part of the PCB, and the micro strips on the upper and lower surfaces are connected by using a metalized via, and a splicing and overlapping part of the first conductor and the second conductor forms the capacitor. Based on a shape and compositions of the external conductor limited in the second feasible implementation of the first aspect, the internal conductor forming the signal channel is further limited. The capacitor may be formed by the splicing and overlapping part of the strip conductors, or may be formed by the splicing and overlapping part between the microstrips connected by using the metalized via. In this way, two implementations of the capacitor are provided to reduce the length of the main transmission line of the signal channel.

Based on the first feasible implementation of the first aspect, in a fourth feasible implementation of the first aspect, the external conductor of the combiner includes a grounding conductor laid on one surface of a PCB, and the PCB is provided with an opening.

The internal conductor forming the signal channel includes a microstrip laid on the other surface of the PCB and microstrips laid on upper and lower surfaces of the opening, and the microstrips on the upper and lower surfaces of the opening are overlapped to form the capacitor. Another forming manner of the capacitor is provided by using another implementation of the external conductor and the internal conductor. In this implementation, only the PCB and the microstrips are needed, so that a composition structure is simple, and the length of the main transmission line of the signal channel may also be reduced.

Based on the first aspect, or the first feasible implementation of the first aspect, or the second feasible implementation of the first aspect, or the third feasible implementation of the first aspect, or the fourth feasible implementation of the first aspect, in a fifth feasible implementation of the first aspect, the band-stop filter to which the second target combined passband belongs includes a resonant cavity, and the resonant cavity is of a band-stop stub line structure. The resonant cavity of the band-stop filter is further limited, thereby providing an implementation of a structure of the resonant cavity.

Based on the fifth feasible implementation of the first aspect, in a sixth feasible implementation of the first aspect, one end of the stub line structure is free, and the other end is metallically connected to the internal conductor forming the signal channel.

Based on the fifth feasible implementation of the first aspect, in a seventh feasible implementation of the first aspect, one end of the stub line structure is metallically connected to the external conductor of the combiner, and the other end is capacitive-coupled to the internal conductor forming the signal channel.

Based on the fifth feasible implementation of the first aspect, in an eighth feasible implementation of the first aspect, one end of the stub line structure is metallically connected to the external conductor of the combiner, and the other end is free, a middle part of the stub line structure is connected to one end of a conductor, and the other end of the conductor is metallically connected to the internal conductor forming the signal channel.

A second aspect of the present invention provides an antenna device, including the combiner in any one of the feasible implementations of the first aspect.

In the embodiments of the present invention, the combiner includes the external conductor and the internal conductor, the external conductor and the internal conductor form the at least two band-stop filters, the at least two band-stop filters form the at least two passbands, the at least two passbands include the first target combined passband and the second target combined passband, the frequency of the first target combined passband is lower than the frequency of the second target combined passband, the signal channel is included between the signal input end and the signal output end of the band-stop filter to which the second target combined passband belongs, the signal channel is formed by the internal conductor, and the internal conductor forming the signal channel includes the capacitor. The capacitor is disposed in the signal channel of the band-stop filter to which the combined passband with a higher passband frequency belongs, thereby shortening the length of the main transmission line of the signal channel and reducing the volume of the combiner while keeping the required steep roll-off feature of the band-stop filter.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, a filter is a device for implementing signal selection, and a basic function is to pass a signal within a passband frequency, that is, a useful signal of this device, with a loss as low as possible, and to filter signals beyond the passband frequency, that is, useless signals of this device, as many as possible. A band-stop filter performs a resonance processing on an input signal by using a plurality of resonant cavities, to form a band-stop signal. That is, the band-stop filter has a stopband frequency and a passband frequency.

As shown in FIG. 1, FIG. 1 shows an equivalent circuit of an existing combiner according to an embodiment of the present invention. The equivalent circuit includes two band-stop filters, and passband frequencies of the two band-stop filters are relatively close. Therefore, output signals of the two band-stop filters are combined. In the existing combiner shown in FIG. 1, a passband frequency of a band-stop filter B is higher than a passband frequency of a band-stop filter A. In an actual design, a transmission line of a signal channel between two resonant cavities in the band-stop filter B needs to be designed to be ¼ longer than a wavelength corresponding to a resonance frequency. This increases a volume and structure complexity of the combiner.

To resolve this problem, in this embodiment of the present invention, a capacitor is added onto the signal channel of the band-stop filter B, to form a hybrid filter between a band-stop filter and a high-pass filter, thereby greatly shortening a required length of a main transmission line of the signal channel, and reducing the volume of the combiner. In this embodiment of the present invention, a structure of the hybrid filter is mainly described. It should be noted that in an actual application, there may be at least two band-stop filters forming the combiner. The above descriptions about the combiner formed by the two band-stop filters are only an example.

In this embodiment of the present invention, the at least two band-stop filters may form at least two passbands. When the at least two band-stop filters are combined, adjacent relationships between the passbands generated by the band-stop filters and distances between the passbands vary. In this embodiment of the present invention, in adjacent passbands, only passbands having a small distance therebetween, that is, passbands that are adjacent to but do not overlap each other and that are relatively close to each other, are combined. For example, if a passband of a first band-stop filter is 1710 Hz to 1880 Hz and a passband of a second band-stop filter is 1920 Hz to 2170 Hz, a distance between the passband of the first band-stop filter and the passband of the second band-stop filter is 40 Hz. The passband of the first band-stop filter and the passband of the second band-stop filter are passbands that are relatively close, and fall within the scope of the present invention. Usually, a preset threshold of a frequency difference between passbands is set as a definition for distinguishing whether passbands are relatively close. If two passbands that are relatively far away from each other are combined, a problem that the main transmission line of the signal channel is relatively long does not exist.

In this embodiment of the present invention, a first target combined passband and a second target combined passband are passbands that do not overlap and that are close to each other in the at least two passbands. A frequency difference between the first target combined passband and the second target combined passband is less than the preset threshold, that is, the first target combined passband is adjacent to and relatively close to the second target combined passband. The second target combined passband may include at least one passband, passbands in the at least one passband are adjacent to but do not overlap each other, and the adjacent passbands are relatively close to each other. A frequency of the first target combined passband is lower than a frequency of the second target combined passband. In this embodiment of the present invention, a band-stop filter to which the second target combined passband belongs is mainly improved.

Figure 2:
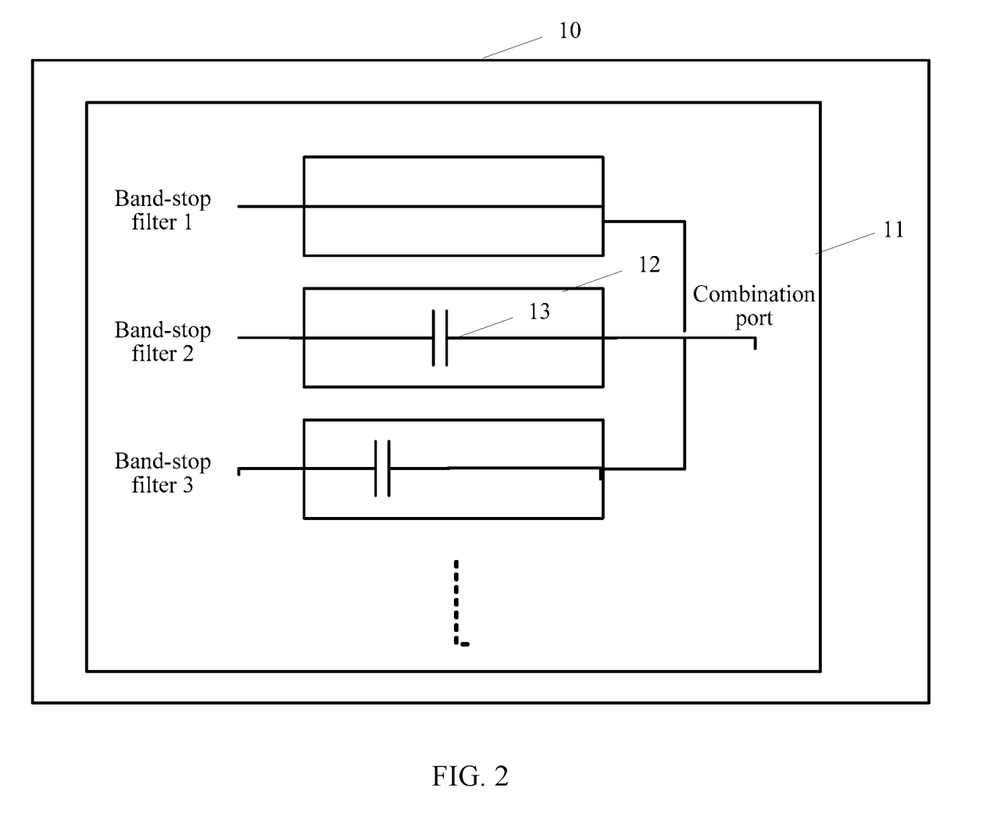
FIG. 2 is a schematic structural diagram of a combiner according to an embodiment of the present invention.

Referring to FIG. 2, FIG. 2 is a schematic structural diagram of a combiner according to an embodiment of the present invention. As shown in FIG. 2, the combiner of this embodiment of the present invention includes an external conductor 10 and an internal conductor 11.

In this embodiment of the present invention, the external conductor 10 and the internal conductor 11 form at least two band-stop filters 12, as shown in FIG. 2, a band-stop filter 1, a band-stop filter 2, a band-stop filter 3, and the like. The band-stop filters are combined by using a combination port, and the at least two band-stop filters form at least two passbands. Further, the at least two passbands include a first target combined passband and a second target combined passband, and a frequency of the first target combined passband is lower than a frequency of the second target combined passband.

In this embodiment of the present invention, a band-stop filter to which the second target combined passband belongs is mainly improved. A signal channel is included between a signal input end and a signal output end of the band-stop filter to which the second target combined passband belongs, the signal channel is formed by the internal conductor, and the internal conductor forming the signal channel includes a capacitor 13. As shown in FIG. 2, signal channels of the band-stop filter 2 and the band-stop filter 3 include the capacitor.

Figure 7:
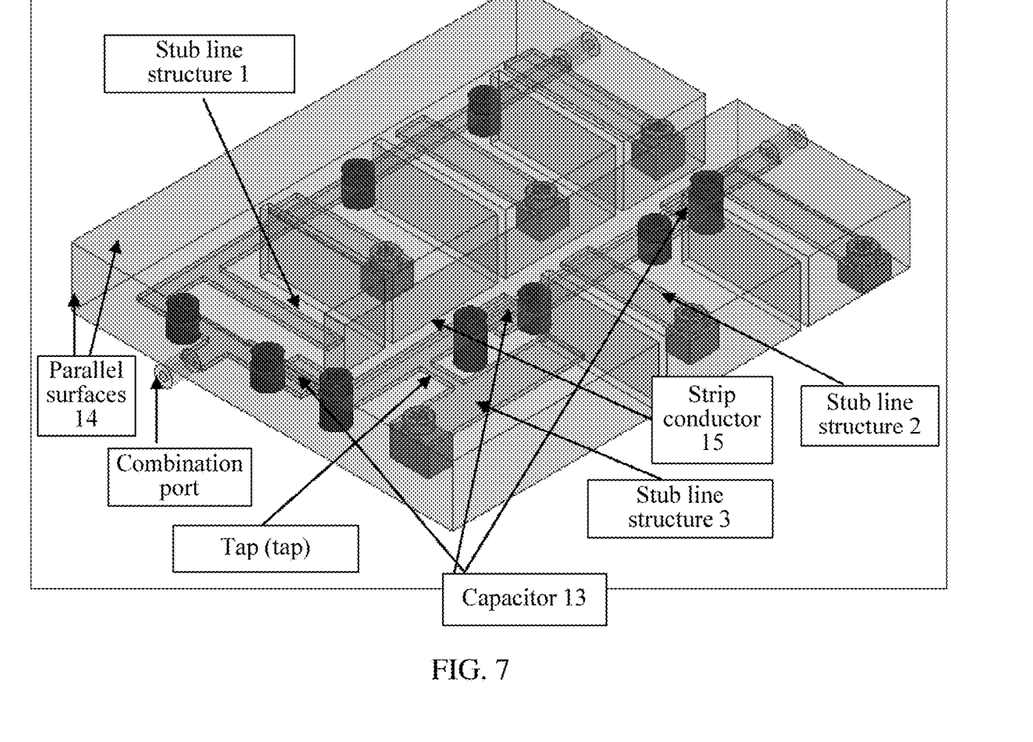
FIG. 7 is a schematic structural diagram of a combiner according to an embodiment of the present invention.

In an optional embodiment, the external conductor of the combiner includes two opposite parallel surfaces such as parallel surfaces 14 shown in FIG. 7, and a metal is disposed on or a conducting layer is attached to the two parallel surfaces.

Figure 8:
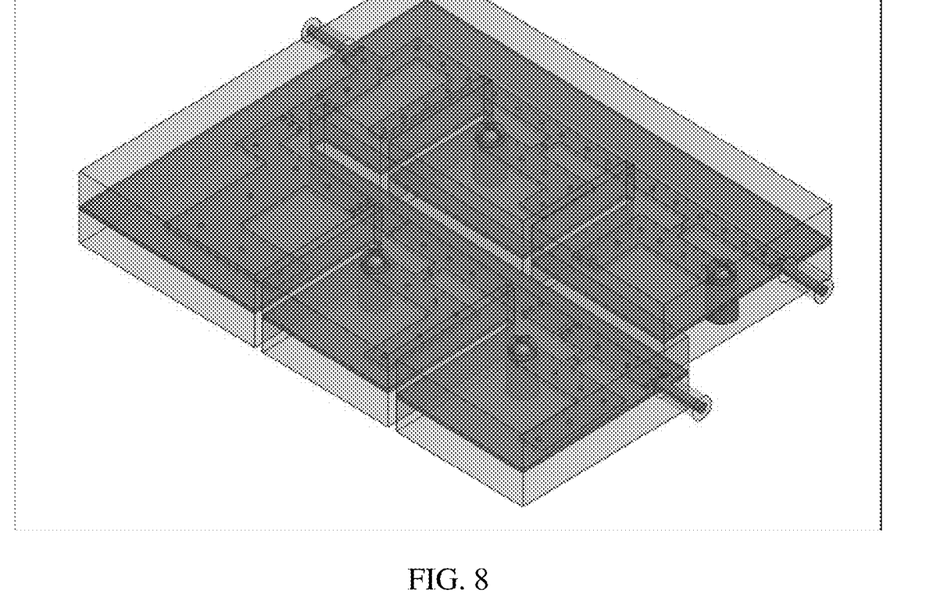
FIG. 8 is a schematic structural diagram of another combiner according to an embodiment of the present invention.

As shown in FIG. 7 and FIG. 8, the external conductor of the combiner is a box that is provided with a metal or is attached with a conducting layer. The box includes upper and lower opposite parallel surfaces. Further, the box is externally connected to a radio frequency connector or a radio frequency cable used as a signal input end and a signal output end.

Figure 3:
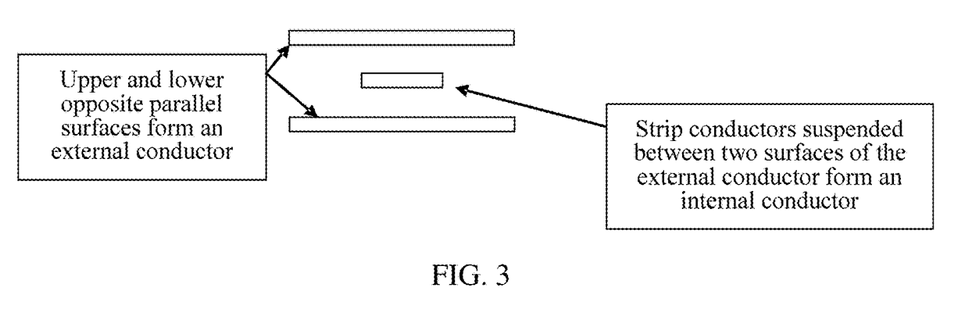
FIG. 3 is a schematic structural diagram of a stripline according to an embodiment of the present invention.

Optionally, the internal conductor forming the signal channel includes at least two strip conductors, a splicing and overlapping part exists between strip conductors of the signal channel of the band-stop filter to which the frequency of the second target combined passband belongs, and the splicing and overlapping part forms a capacitor serially connected to the signal channel. As shown in FIG. 7, FIG. 7 is a schematic structural diagram of a combiner according to an embodiment of the present invention. An external conductor of the combiner is a box that is provided with a metal or is attached with a conducting layer. The box includes upper and lower opposite parallel surfaces 14. In the box, several strip conductors are in communication with a signal input end and a signal output end, to form a signal channel. Two band-stop filters are included in FIG. 7, and a signal channel of a band-stop filter with a higher passband frequency is characterized in that the signal channel is also formed by several strip conductors 15, a metallic connection does not exist between the conductors, and a splicing and overlapping part between the strip conductors forms a capacitor 13. Further, as shown in FIG. 3, FIG. 3 is a schematic diagram of a stripline filter formed by strip conductors according to an embodiment of the present invention. The stripline filter includes upper and lower opposite parallel surfaces, and the two opposite parallel surfaces form an external conductor. The two opposite parallel surfaces are equivalent to the two opposite parallel surfaces of the metal box in FIG. 7. Strip conductors suspended between the two opposite parallel surfaces form an internal conductor. As shown in FIG. 7, splicing and overlapping exists between the at least two strip conductors forming the signal channel, and the splicing and overlapping part forms the capacitor of the signal channel. Three formed capacitors serially connected to the signal channel are marked in FIG. 7.

Figure 4:
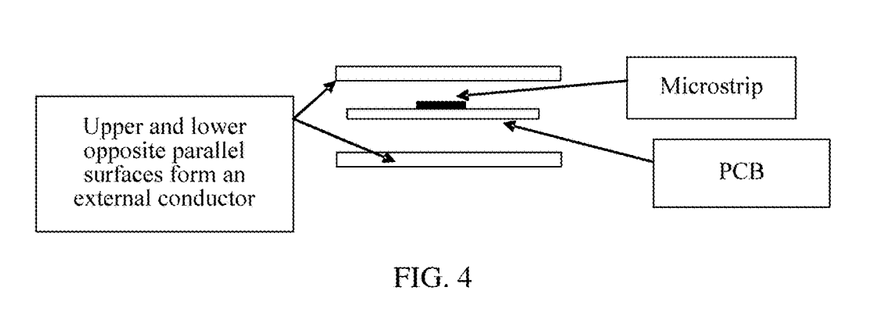
FIG. 4 is a schematic structural diagram of a suspended stripline of a PCB according to an embodiment of the present invention.
Figure 5:
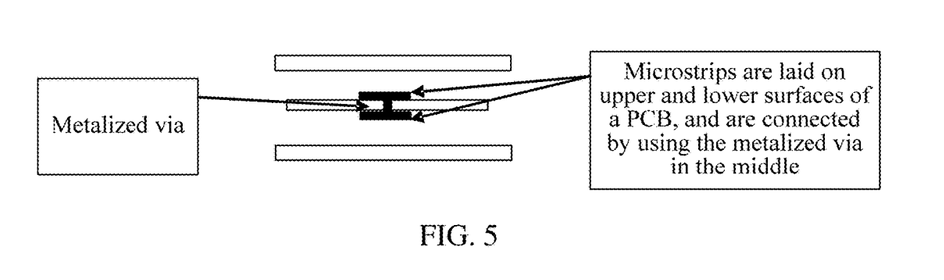
FIG. 5 is a schematic structural diagram of another suspended stripline of a PCB according to an embodiment of the present invention.
Figure 9:
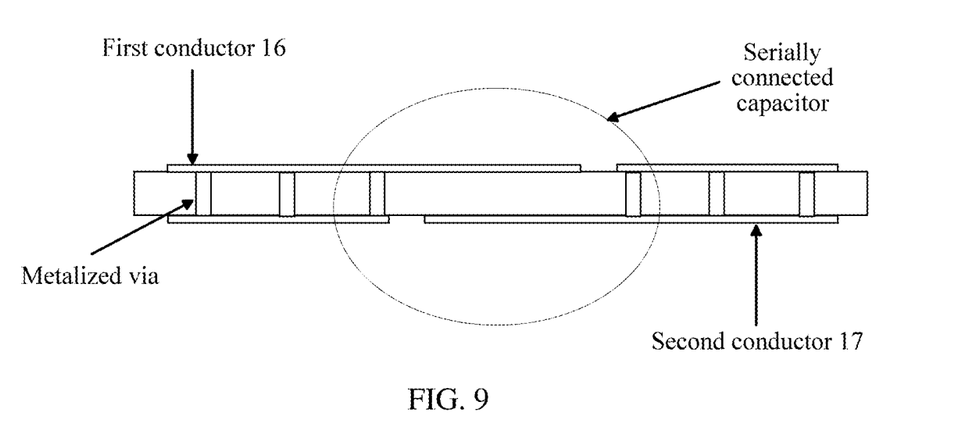
FIG. 9 is an enlarged view of a splicing part according to an embodiment of the present invention.

As shown in FIG. 8, FIG. 8 is a schematic structural diagram of another combiner according to an embodiment of the present invention. An external conductor of the combiner is still a box that is provided with a metal or is attached with a conducting layer. The box includes upper and lower opposite parallel surfaces. In the box, several microstrips laid on upper and lower surfaces of a PCB form an internal conductor, and the micro strips on the upper and lower surfaces are the same. As shown in FIG. 4, the microstrips are laid on the PCB to form the internal conductor. It should be noted that in this embodiment of the present invention, the microstrips laid on the upper and lower surfaces of the PCB are connected by using a metalized via. As shown in FIG. 5, the microstrips laid on the upper and lower surfaces of the PCB are connected by using the metalized via. The microstrips connected by using the metalized via actually already form a conductor. In FIG. 8, formed several conductors form the internal conductor of the combiner, and a signal channel in communication with a signal input end and a signal output end is also formed by a plurality of conductors. Two band-stop filters are included in FIG. 8, and a signal channel of a band-stop filter with a higher passband frequency is characterized in that the signal channel is also formed by several conductors formed by the microstrips, and a splicing and overlapping part between the conductors forms a capacitor serially connected to the signal channel. Further, FIG. 9 is an enlarged view of a splicing part of conductors according to an embodiment of the present invention. Splicing exists between a first conductor and a second conductor that form a signal channel, and the splicing and overlapping part forms a capacitor. As shown in FIG. 9, both the first conductor and the second conductor are formed by microstrips connected by using a metalized via.

Specifically and optionally, as shown in FIG. 9, an internal conductor forming the signal channel includes the first conductor 16 and the second conductor 17. The first conductor is formed by microstrips laid on upper and lower surfaces of a first part of a printed circuit board PCB, and the microstrips on the upper and lower surfaces are connected by using a metalized via. The second conductor is formed by microstrips laid on upper and lower surfaces of a second part of the PCB, and the microstrips on the upper and lower surfaces are connected by using a metalized via. The splicing and overlapping part of the first conductor and the second conductor forms the capacitor serially connected to the signal channel, and the splicing and overlapping part is marked by using a circle in FIG. 9.

In another optional embodiment, an external conductor of the combiner includes a grounding conductor laid on one surface of the PCB, and the PCB is provided with an opening.

The internal conductor forming the signal channel includes a microstrip laid on the other surface of the PCB and microstrips laid on upper and lower surfaces of the opening, and an overlapping part of the microstrips on the upper and lower surfaces of the opening forms the capacitor serially connected to the signal channel.

Figure 6:
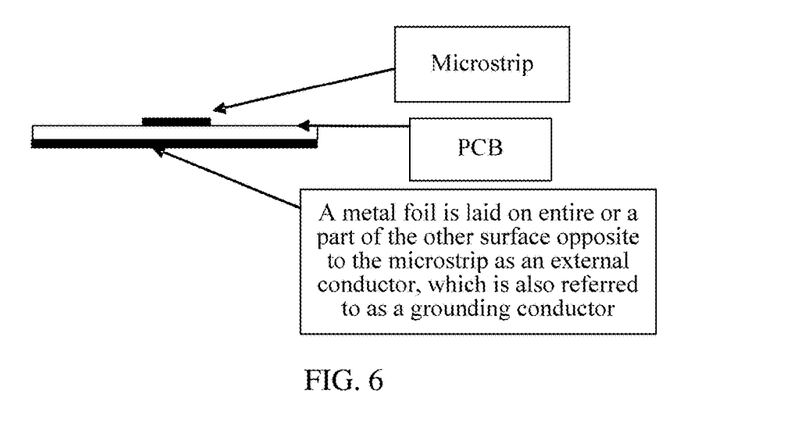
FIG. 6 is a schematic structural diagram of a PCB filter according to an embodiment of the present invention.

As shown in FIG. 6, FIG. 6 is a schematic structural diagram of a PCB filter according to an embodiment of the present invention. A microstrip is laid on one surface of a PCB, a metal foil is laid on entire or a part of the other surface opposite to the microstrip as an external conductor, which is also referred to as a grounding conductor. In the embodiments of the present invention, the microstrips of the signal channel may not exist only on the surface opposite to the external conductor; instead, some microstrips may exist on the same surface as the grounding conductor, and a window is opened in the grounding conductor to leave space for the microstrips, that is, an opening is formed at the location of the PCB, and an overlapping part of the microstrips on upper and lower surfaces of the opening form a capacitor serially connected to the signal channel.

Figure 10:
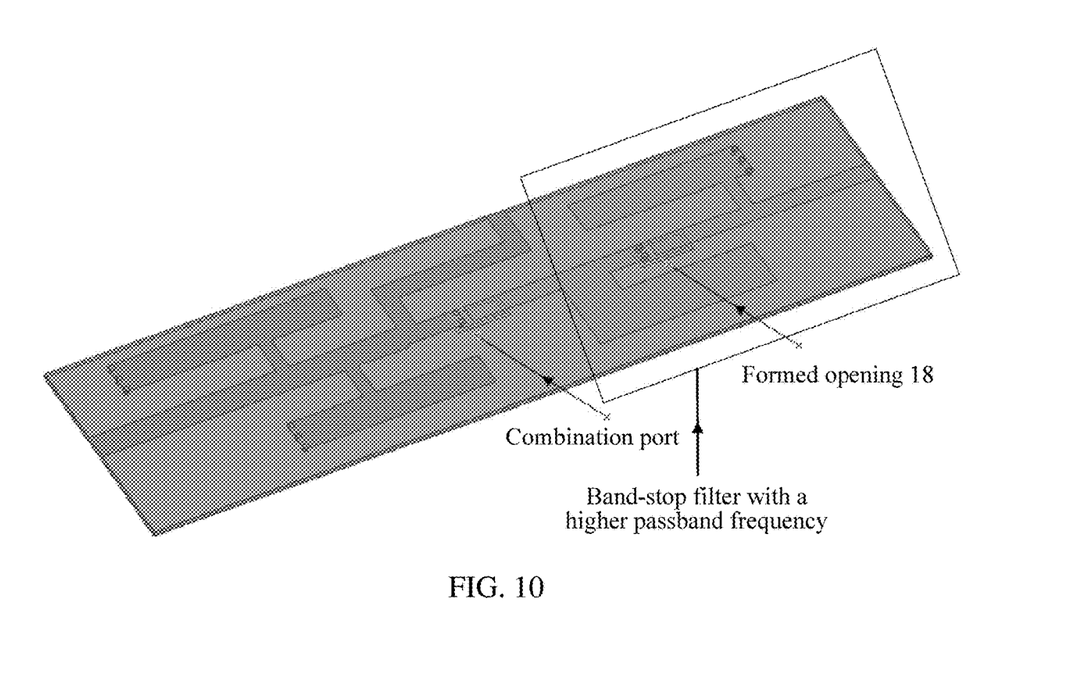
FIG. 10 is a schematic structural diagram of still another combiner according to an embodiment of the present invention.

As shown in FIG. 10, FIG. 10 is a schematic structural diagram of still another combiner formed in the foregoing manner. A combination port is marked in FIG. 10, and the combiner performs a combination on two band-stop filters. A PCB of the band-stop filter with a higher passband frequency is provided with an opening 18, and microstrips laid on upper and lower surfaces of the opening overlap to form a capacitor. It should be noted that on another PCB located at the opening, a microstrip is laid on one surface and a grounding conductor is laid on the other surface.

Optionally, a band-stop filter to which a frequency of a second target combined passband belongs includes a resonant cavity, the resonant cavity is of a band-stop stub line structure, and signal coupling exists between the band-stop stub line structure and a signal channel.

In an optional implementation, one end of the stub line structure is free and the other end is metallically connected to an internal conductor forming the signal channel, for example, a stub line structure 1 is shown in FIG. 7.

In another optional implementation, one end of the stub line structure is metallically connected to the external conductor of the combiner and the other end is capacitive-coupled to the internal conductor forming the signal channel, for example, a stub line structure 2 is shown in FIG. 7.

In still another optional implementation, one end of the stub line structure is metallically connected to the external conductor of the combiner, and the other end is free, a middle part of the stub line structure is connected to one end (that is, a tap of a stub line structure b in FIG. 7) of a conductor, and the other end of the conductor is metallically connected to the internal conductor forming the signal channel. Such a stub line structure is, for example, a stub line structure 3 in FIG. 7.

In the embodiments of the present invention, the combiner includes the external conductor and the internal conductor, the external conductor and the internal conductor form the at least two band-stop filters, the at least two band-stop filters form the at least two passbands, the at least two passbands include the first target combined passband and the second target combined passband, the frequency of the first target combined passband is lower than the frequency of the second target combined passband, the signal channel is included between the signal input end and the signal output end of the band-stop filter to which the second target combined passband belongs, the signal channel is formed by the internal conductor, and the internal conductor forming the signal channel includes the capacitor. The capacitor is disposed in the signal channel of the band-stop filter to which the combined passband with a higher passband frequency belongs, thereby shortening a length of a main transmission line of the signal channel and reducing a volume of the combiner while keeping a required steep roll-off feature of the band-stop filter.

Figure 11:
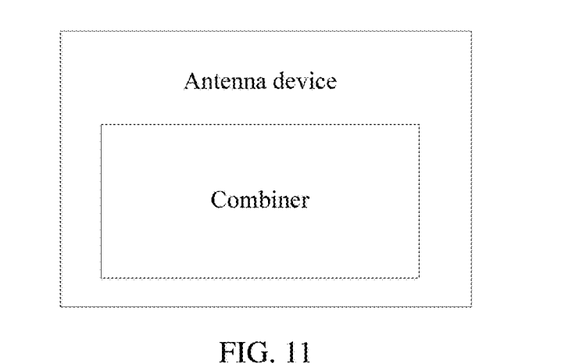
FIG. 11 is a schematic structural diagram of an antenna device according to an embodiment of the present invention.

As shown in FIG. 11, FIG. 11 shows an antenna device according to an embodiment of the present invention. The antenna device includes the combiner provided in the embodiments of the present invention. The combiner includes the external conductor and the internal conductor, the external conductor and the internal conductor form the at least two band-stop filters, and the at least two band-stop filters form the at least two passbands.

The formed at least two passbands include the first target combined passband and the second target combined passband, and the frequency of the first target combined passband is lower than the frequency of the second target combined passband.

The signal channel is included between the signal input end and the signal output end of the band-stop filter to which the second target combined passband belongs, the signal channel is formed by the internal conductor, and the internal conductor forming the signal channel includes the capacitor.

The capacitor is added into the signal channel of the band-stop filter to which the second target combined passband of the combiner belongs, thereby shortening a length of a transmission line of the signal channel of the band-stop filter to which the second target combined passband belongs, and reducing a volume of the combiner.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

A sequence of the steps of the method in the embodiments of the present invention may be adjusted, and certain steps may also be merged or removed according to an actual requirement.

The modules or the units in the terminal in the embodiments of the present invention may be combined, divided, and deleted according to an actual requirement.

A microcontroller and other components in the embodiments of the present invention may be implemented by using a universal integrated circuit such as a central processing unit (CPU), or an application-specific integrated circuit (ASIC).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A combiner comprising:
   an external conductor; and
   an internal conductor,
   wherein the external conductor and the internal conductor form at least two filters, and the at least two filters form at least two passbands,
   wherein the at least two passbands comprise a first target combined passband and a second target combined passband, and a frequency of the first target combined passband is lower than a frequency of the second target combined passband, and
   wherein a signal channel is formed between a signal input end and a signal output end of a filter to which the second target combined passband belongs, the signal channel is formed by the internal conductor, and the internal conductor forming the signal channel comprises a capacitor,
   wherein the second target combined passband comprises at least one passband,
   wherein passbands in the at least one passband are adjacent to but do not overlap each other, and a frequency difference between adjacent passbands is less than a preset threshold, and
   wherein a frequency difference between the first target combined passband and the second target combined passband is less than the preset threshold.

2. The combiner according to claim 1, wherein the external conductor of the combiner comprises two opposite parallel surfaces, and a metal is disposed on or a conducting layer is attached to the two opposite parallel surfaces.

3. The combiner according to claim 2, wherein the internal conductor forming the signal channel comprises at least two strip conductors, and a splicing and overlapping part of the at least two strip conductors forms the capacitor; or
   the internal conductor forming the signal channel comprises a first conductor and a second conductor, the first conductor is formed by microstrips laid on upper and lower surfaces of a first part of a printed circuit board (PCB), and the microstrips on the upper and lower surfaces are connected by using a metalized via, the second conductor is formed by microstrips laid on upper and lower surfaces of a second part of the PCB, and the microstrips on the upper and lower surfaces are connected by using a metalized via, and a splicing and overlapping part of the first conductor and the second conductor forms the capacitor.

4. The combiner according to claim 1, wherein the external conductor of the combiner comprises a grounding conductor laid on one surface of a PCB, and the PCB is provided with an opening; and
   wherein the internal conductor forming the signal channel comprises a microstrip laid on the other surface of the PCB and microstrips laid on upper and lower surfaces of the opening, and the microstrips laid on the upper and lower surfaces of the opening are overlapped to form the capacitor.

5. The combiner according to claim 1, wherein the filter to which the second target combined passband belongs comprises a resonant cavity, and the resonant cavity is of a band-stop stub line structure.

6. The combiner according to claim 5, wherein one end of the stub line structure is free, and the other end is metallically connected to the internal conductor forming the signal channel.

7. The combiner according to claim 5, wherein one end of the stub line structure is metallically connected to the external conductor of the combiner, and the other end is capacitive-coupled to the internal conductor forming the signal channel.

8. The combiner according to claim 5, wherein one end of the stub line structure is metallically connected to the external conductor of the combiner, and the other end is free, a middle part of the stub line structure is connected to one end of a conductor, and the other end of the conductor is metallically connected to the internal conductor forming the signal channel.

9. An antenna device, comprising:
   a combiner, wherein the combiner comprises an external conductor and an internal conductor, the external conductor and the internal conductor form at least two filters, and the at least two filters form at least two passbands, wherein:
   the at least two passbands comprise a first target combined passband and a second target combined passband, and a frequency of the first target combined passband is lower than a frequency of the second target combined passband; and
   a signal channel is comprised between a signal input end and a signal output end of a filter to which the second target combined passband belongs, the signal channel is formed by the internal conductor, and the internal conductor forming the signal channel comprises a capacitor,
   wherein the second target combined passband comprises at least one passband,
   wherein passbands in the at least one passband are adjacent to but do not overlap each other, and a frequency difference between adjacent passbands is less than a preset threshold, and
   wherein a frequency difference between the first target combined passband and the second target combined passband is less than the preset threshold.

10. The antenna device according to claim 9, wherein the external conductor of the combiner comprises two opposite parallel surfaces, and a metal is disposed on or a conducting layer is attached to the two opposite parallel surfaces.

11. The antenna device according to claim 10, wherein the internal conductor forming the signal channel comprises at least two strip conductors, and a splicing and overlapping part of the at least two strip conductors forms the capacitor; or the internal conductor forming the signal channel comprises a first conductor and a second conductor 17, the first conductor is formed by microstrips laid on upper and lower surfaces of a first part of a printed circuit board (PCB), and the microstrips on the upper and lower surfaces are connected by using a metalized via, the second conductor is formed by microstrips laid on upper and lower surfaces of a second part of the PCB, and the microstrips on the upper and lower surfaces are connected by using a metalized via, and a splicing and overlapping part of the first conductor and the second conductor forms the capacitor.

12. The antenna device according to claim 9, wherein the external conductor of the combiner comprises a grounding conductor laid on one surface of a PCB, and the PCB is provided with an opening; and the internal conductor forming the signal channel comprises a microstrip laid on the other surface of the PCB and microstrips laid on upper and lower surfaces of the opening, and the microstrips laid on the upper and lower surfaces of the opening are overlapped to form the capacitor.

13. The antenna device according to claim 9, wherein the filter to which the second target combined passband belongs comprises a resonant cavity, and the resonant cavity is of a band-stop stub line structure.

14. The antenna device according to claim 13, wherein one end of the stub line structure is free, and the other end is metallically connected to the internal conductor forming the signal channel.

15. The antenna device according to claim 13, wherein one end of the stub line structure is metallically connected to the external conductor of the combiner, and the other end is capacitive-coupled to the internal conductor forming the signal channel.

16. The antenna device according to claim 13, wherein one end of the stub line structure is metallically connected to the external conductor of the combiner, and the other end is free, a middle part of the stub line structure is connected to one end of a conductor, and the other end of the conductor is metallically connected to the internal conductor forming the signal channel.

* * * * *